United States Patent
Gillette et al.

(10) Patent No.: US 11,573,361 B2
(45) Date of Patent: *Feb. 7, 2023

(54) ROLL OF FILM INCLUDING MULTILAYER BIREFRINGENT REFLECTIVE POLARIZER AND POLYVINYL ALCOHOL LAYER WITH LOW PASS AXIS VARIATION

(71) Applicant: 3M INNOVATIVE PROPERTIES COMPANY, St. Paul, MN (US)

(72) Inventors: Kristy A. Gillette, Spring Valley, WI (US); Carl A. Stover, St. Paul, MN (US); Matthew B. Johnson, Woodbury, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 460 days.

This patent is subject to a terminal disclaimer.

(21) Appl. No.: 16/624,455

(22) PCT Filed: Jun. 26, 2018

(86) PCT No.: PCT/IB2018/054705
§ 371 (c)(1),
(2) Date: Dec. 19, 2019

(87) PCT Pub. No.: WO2019/003107
PCT Pub. Date: Jan. 3, 2019

(65) Prior Publication Data
US 2020/0183068 A1    Jun. 11, 2020

Related U.S. Application Data

(60) Provisional application No. 62/524,978, filed on Jun. 26, 2017.

(51) Int. Cl.
| | | |
|---|---|---|
| G02B 5/30 | (2006.01) | |
| B32B 7/023 | (2019.01) | |
| B32B 27/30 | (2006.01) | |

(52) U.S. Cl.
CPC ............ *G02B 5/3083* (2013.01); *B32B 7/023* (2019.01); *B32B 27/30* (2013.01); *G02B 5/305* (2013.01); *G02B 5/3066* (2013.01)

(58) Field of Classification Search
CPC .... G02B 5/3083; G02B 5/305; G02B 5/3066; G02B 5/30; G02B 5/3025; G02B 5/3033;
(Continued)

(56) References Cited

U.S. PATENT DOCUMENTS

| | | |
|---|---|---|
| 3,610,729 A | 10/1971 | Howard |
| 4,446,305 A | 5/1984 | Rogers |

(Continued)

FOREIGN PATENT DOCUMENTS

| | | |
|---|---|---|
| JP | 2010-091811 | 4/2010 |
| JP | 2011-215216 | 10/2011 |

(Continued)

OTHER PUBLICATIONS

International Search Report for PCT International Application No. PCT/IB2018/054705, dated Oct. 25, 2018, 8pgs.

*Primary Examiner* — Stephone B Allen
*Assistant Examiner* — Adam W Booher
(74) *Attorney, Agent, or Firm* — Clifton F. Richardson

(57) ABSTRACT

Rolls of film are described. In particular, rolls of film including a multilayer birefringent reflective polarizer and a polyvinyl alcohol layer are described. Such films exhibit low variation in pass axis across a full crossweb width.

12 Claims, 3 Drawing Sheets

(58) Field of Classification Search
CPC ...... G02B 5/3041; G02B 27/28; B32B 7/023; B32B 27/30
See application file for complete search history.

(56) References Cited

U.S. PATENT DOCUMENTS

| | | | |
|---|---|---|---|
| 4,540,623 | A | 9/1985 | Im |
| 4,659,523 | A | 4/1987 | Rogers |
| 5,448,404 | A | 9/1995 | Schrenk |
| 5,882,774 | A | 3/1999 | Jonza |
| 6,096,375 | A | 8/2000 | Ouderkirk |
| 6,111,697 | A | 8/2000 | Merrill |
| 6,113,811 | A | 9/2000 | Kausch |
| 6,610,356 | B2 * | 8/2003 | Kausch .............. C08J 5/18 252/585 |
| 6,697,195 | B2 | 2/2004 | Weber |
| 6,939,499 | B2 | 9/2005 | Merrill |
| 7,104,776 | B2 | 9/2006 | Merrill |
| 7,826,009 | B2 | 11/2010 | Weber |
| 2007/0047080 | A1 | 3/2007 | Stover |
| 2007/0231548 | A1 | 10/2007 | Merrill |
| 2007/0298271 | A1 | 12/2007 | Liu |
| 2008/0151371 | A1 | 6/2008 | Weber |
| 2011/0102891 | A1 | 5/2011 | Derks |
| 2015/0022888 | A1 | 1/2015 | Weber |
| 2015/0036082 | A1 | 2/2015 | Cho |
| 2015/0124194 | A1 | 5/2015 | Oya |
| 2015/0378077 | A1 | 12/2015 | Haag |
| 2016/0306086 | A1 | 10/2016 | Haag |
| 2017/0123267 | A1 | 4/2017 | Yanai et al. |
| 2020/0166684 | A1 * | 5/2020 | Gillette .............. G02F 1/133536 |

FOREIGN PATENT DOCUMENTS

| | | |
|---|---|---|
| JP | 2016-122190 A | 7/2016 |
| WO | WO 99-36812 | 7/1999 |
| WO | WO 2015-085114 | 6/2015 |
| WO | WO 2017-034892 | 3/2017 |
| WO | WO 2018-163009 | 9/2018 |

* cited by examiner

ROLL OF FILM INCLUDING MULTILAYER BIREFRINGENT REFLECTIVE POLARIZER AND POLYVINYL ALCOHOL LAYER WITH LOW PASS AXIS VARIATION

BACKGROUND

Multilayer birefringent reflective polarizers may be delivered in roll form. Reflective polarizers preferentially reflect light of one polarization while substantially transmitting light of an orthogonal polarization. Reflective polarizers have a pass axis. The pass axis is parallel to the linear polarization of light that is substantially transmitted.

SUMMARY

In one aspect, the present description relates to a roll of film. In particular, the roll of film includes a multilayer birefringent reflective polarizer having a pass axis that varies along a crossweb direction. The multilayer birefringent reflective polarizer includes alternating layers of a birefringent layer and an isotropic layer and an oriented layer of polyvinyl alcohol. The pass axis of the multilayer birefringent reflective polarizer varies by no more than about 1 degree across a full crossweb width of the roll of film. The full crossweb width is greater than 27 inches. The multilayer birefringent reflective polarizer, if stained with iodine dye, exhibits a contrast ratio of at least 2000:1, and a pass state transmission, from 425 nm to 675 nm at normal incidence of at least 60%.

In another aspect, the present description relates to a method of processing a polymeric multilayer web. In particular, the method includes providing a polymeric multilayer web including alternating layers of a layer capable of developing birefringence including polyethylene naphthalate or a copolymer including polyethylene naphthalate and polyethylene terephthalate, and an isotropic layer; coating a layer of polyvinyl alcohol on the polymeric multilayer web; heating the polymeric multilayer web beyond the glass transition temperature of layer capable of developing birefringence; forming a multilayer reflective polarizer by tentering the polymeric multilayer web with a total transverse direction draw ratio of about 6.5 or greater such that the layer capable of developing birefringence develops birefringence. The multilayer reflective polarizer has a pass axis, and the pass axis varies by no more than 1 degree across a full crossweb width.

DETAILED DESCRIPTION

Figure 1:
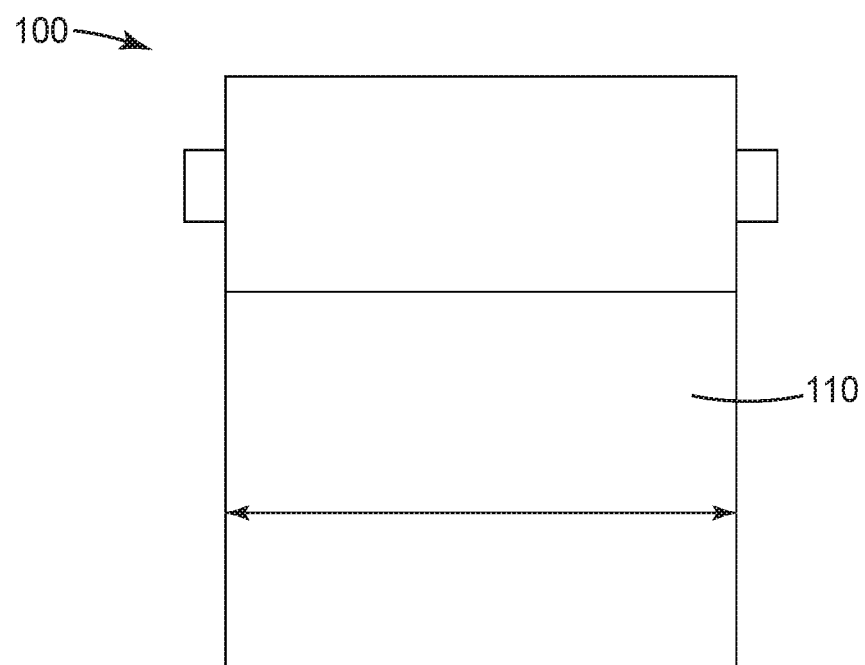
FIG. 1 is a top plan view of a roll of film.

Multilayer birefringent reflective polarizers are formed by stretching a polymeric web including at least one layer capable of developing birefringence and one other layer. In some embodiments, the other layer is an isotropic layer; i.e., the layer is not designed to become birefringent under the same stretching conditions as the layer capable of developing birefringence. In some embodiments, the isotropic layer is isotropic because it does not develop birefringence due to its molecular structure. In some embodiments, the isotropic layer is isotropic because it does not develop birefringence at the same temperature as the layer capable of developing birefringence.

Reflective polarizers are useful in displays; particularly in liquid crystal displays or other transmissive displays that utilize a backlight for uniform illumination. Reflective polarizers are typically laminated to, attached to, or disposed next to conventional absorbing polarizers, in order to provide a sufficient contrast ratio (the ratio of the maximum to minimum transmission while the backlight is on) to be useful or acceptable as a display. However, the lamination/attachment process or the handling and converting of separate films adds manufacturing cost and complexity. Further, due to unevenness in stretch during the orientation process, conventional reflective polarizers have a large variation in pass axis direction along a crossweb direction. For some conventional reflective polarizers, the pass axis can vary along the full crossweb width by 3 degrees or more. The variation in pass axis direction makes it difficult to align the axes of the reflective polarizer and absorbing polarizer, which results in a worse contrast ratio or lower transmission for the display. Alternatively, a large quantity of material may need to be discarded in order to find a film component both properly sized and having suitable levels of pass axis variation. Moreover, the conventional orientation process for standard reflective polarizers and for standard absorbing polarizers results in the pass axes being orthogonal to one another when aligned crossweb. Therefore, aligning the pass axes requires converting from rolls of film, rotating the films relative to each other, and then laminating or stacking the films on top of one other. The required converting and attachment steps may result in yield loss, additional manufacturing cost, and other inefficiencies. Further, the requirement of two separate films—plus an optically clear adhesive for lamination—creates a large baseline thickness for the overall film stack.

Described herein are multilayer birefringent reflective polarizers that may be delivered in roll form. The multilayer birefringent reflective polarizer includes a polyvinyl alcohol layer. When the polyvinyl alcohol layer is stained with iodine, the multilayer birefringent reflective polarizer may exhibit a contrast ratio of greater than 2000:1, greater than 5000:1, or even greater than 10000:1 or 13000:1. These high contrast ratios are at least in part based on excellent pass axis uniformity across the web. In some embodiments, the pass axis may vary by no more than 1.5 degrees (peak to valley) across the entire crossweb width of a roll of film.

Modification of certain process conditions can enable film rolls of reflective polarizers as described herein. Stretching conditions for the polymeric multilayer web in particular may have a significant effect on pass axis variation. For example, surprisingly high transverse direction draw ratios enabled the development of highly birefringent interfaces while still maintaining good uniformity across the crossweb width. In some embodiments, the total transverse direction draw ratio (i.e., the ratio of the final transverse width to the initially casted, pre-stretching width is very high. In some embodiments, the total transverse direction draw ratio of at least 6. In some embodiments, the total transverse direction draw ratio is at least 7. In some embodiments, the total transverse direction draw ratio is at least 7.5.

FIG. 1 is a top plan view of a roll of film. Roll 100 includes multilayer birefringent reflective polarizer 110.

Multilayer birefringent reflective polarizer 110 includes alternating microlayers of at least two different materials. Multilayer optical films, i.e., films that provide desirable transmission and/or reflection properties at least partially by an arrangement of microlayers of differing refractive index, are known. It has been known to make such multilayer optical films by depositing a sequence of inorganic materials in optically thin layers ("microlayers") on a substrate in a vacuum chamber.

Multilayer optical films have also been demonstrated by coextrusion of alternating polymer layers. See, e.g., U.S. Pat. No. 3,610,729 (Rogers), U.S. Pat. No. 4,446,305 (Rogers et al.), U.S. Pat. No. 4,540,623 (Im et al.), U.S. Pat. No. 5,448,404 (Schrenk et al.), and U.S. Pat. No. 5,882,774 (Jonza et al.). In these polymeric multilayer optical films, polymer materials are used predominantly or exclusively in the makeup of the individual layers. Such films are compatible with high volume manufacturing processes and can be made in large sheets and roll goods. In some embodiments, at least one of the materials used in the alternating polymer layers is either polyethylene naphthalate or a copolymer that includes polyethylene terephthalate and polyethylene naphthalate. In some embodiments, at least one of the materials used in the layers capable of developing birefringence is polyethylene naphthalate or a copolymer of polyethylene naphthalate, polyethylene terephthalate, and any other monomer at a mol % less than 10%, with mol % based on the diacid monomer being 100%.

A multilayer optical film includes individual microlayers having different refractive index characteristics so that some light is reflected at interfaces between adjacent microlayers. The microlayers are sufficiently thin so that light reflected at a plurality of the interfaces undergoes constructive or destructive interference in order to give the multilayer optical film the desired reflective or transmissive properties. For multilayer optical films designed to reflect light at ultraviolet, visible, or near-infrared wavelengths, each microlayer generally has an optical thickness (a physical thickness multiplied by refractive index) of less than about 1 µm. Layers may be arranged generally as thinnest to thickest. In some embodiments, the arrangement of the alternating optical layers may vary substantially linearly as a function of layer count. These layer profiles may be referred to as linear layer profiles. In some embodiments, the thickness of the layers may be arranged monotonically. Generally, linear layer profiles are based on the overall shape of the layer arrangement, and minor or insignificant deviations from a linear layer profile would still be considered by a person having ordinary skill in the art as being a linear layer profile. In some embodiments, this may be referred to as a substantially linear layer profile. Thicker layers may be included, such as skin layers at the outer surfaces of the multilayer optical film, or protective boundary layers (PBLs) disposed within the multilayer optical films, that separate coherent groupings (referred to herein as "packets") of microlayers. In some embodiments, multilayer birefringent reflective polarizer 110 may include at least two packets. In some embodiments, the two packets of the multilayer birefringent reflective polarizer have thicknesses that overlap by at least 80%. In some cases, the protective boundary layer may be the same material as at least one of the alternating layers of the multilayer optical film. In other cases, the protective boundary layer may be a different material, selected for its physical or rheological properties. The protective boundary layers may be on one side or on both sides of an optical packet. In the case of a single-packet multilayer optical film, the protective boundary layer may be on one or both external surfaces of the multilayer optical film.

Skin layers are sometimes added which occurs after the feedblock but before the melt exits the film die. The multilayer melt is then cast through a film die onto a chill roll in the conventional manner for polyester films, upon which it is quenched. The cast web is then stretched by at least one of a variety of possible processes to achieve birefringence in at least one of the optical layers, producing in many cases either a reflective polarizer or mirror film, as has been described in, for example, U.S. Patent Publication No. 2007/047080 A1, U.S. Patent Publication No. 2011/0102891 A1, and U.S. Pat. No. 7,104,776 (Merrill et al.). The films, having birefringence, may be referred to as multilayer birefringent reflective polarizers.

Multilayer birefringent reflective polarizer 110 may have any suitable reflection characteristics. For example, multilayer birefringent reflective polarizer 110 may be a reflective polarizer preferentially reflecting light of one polarization while preferentially transmitting light of a second orthogonal polarization. In some embodiments, the multilayer birefringent reflective polarizer may include or be attached to a quarter-wave retarder to effectively form a circular reflective polarizer. The quarter-wave retarder may, in some embodiments, have a retardance within 50 nm of 137.5 nm for 550 nm light. In some embodiments, the quarter-wave retarder may be or include a birefringent stretched polymer film. In some embodiments, the quarter-wave retarder may be or include a liquid crystal layer. In some embodiments, the quarter-wave retarder may be achromatic over an extended wavelength range; that is, the quarter-wave retarder may provide approximately quarter-wave retardation over that extended wavelength range. In some embodiments, multilayer birefringent reflective polarizer 110 transmits at least 60% of pass state light from 425 nm to 675 nm at normal incidence. In some embodiments, multilayer birefringent reflective polarizer 110 transmits at least 70% of pass state light from 425 nm to 675 nm at normal incidence.

In some embodiments, the multilayer birefringent reflective polarizer includes absorbing elements. In some embodiments, these absorbing elements are absorbing polarizing elements. In some embodiments, these absorbing elements are broadband absorbers, which absorb both orthogonal polarizations of light. In some embodiments, the absorbing polarizing elements may be disposed only within the birefringent layers of the multilayer birefringent reflective polarizer. In some embodiments, the absorbing polarizing elements may be disposed only within some of the birefringent layers of the multilayer birefringent reflective polarizer. Exemplary polarizers including absorbing elements are described in U.S. Patent Publication No. 2016-0306086 (Haag et al.) and U.S. Pat. No. 6,096,375 (Ouderkirk et al.).

The crossweb width of the roll of film is shown in FIG. 1. Across the full crossweb width of the roll of film, the pass axis direction may vary by no more than 1.5 degrees, by no more than 1 degree, by no more than 0.8 degrees, or my no more than 0.5 degrees.

In some embodiments, the full crossweb width of the roll of film is large. In some embodiments, the full crossweb width of the roll of film is greater than 27 inches. In some embodiments, it is greater than 30 inches. In some embodiments, it is greater than 32 inches.

In some embodiments, the multilayer birefringent reflective polarizer has highly developed birefringence. In some embodiments, the difference in index of refraction between two adjacent layers in-plane, along a block direction (orthogonal to the pass axis) may be 0.2 or greater. In some embodiments, the different in index of refraction between two adjacent layers in-plane, along a pass direction may be 0.05 or less.

Figure 2:
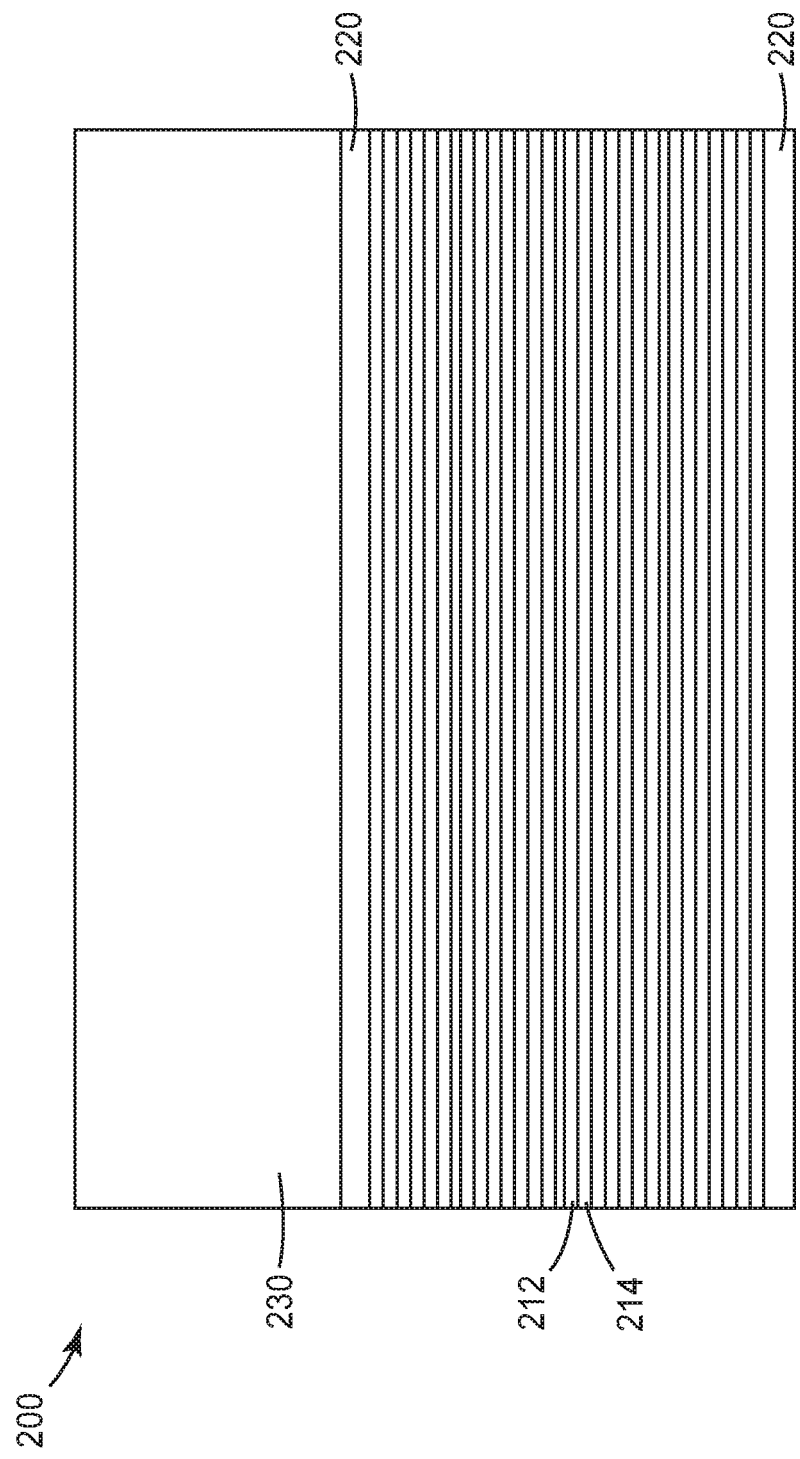
FIG. 2 is a front elevation cross-section of a multilayer birefringent reflective polarizer including a polyvinyl alcohol layer.

FIG. 2 is a front elevation cross-section of a multilayer birefringent reflective polarizer including a polyvinyl alcohol layer. Multilayer birefringent reflective polarizer 200 includes alternating layer capable of developing birefringence 212 and isotropic layer 214, skin layers 220, and polyvinyl alcohol layer 230.

Skin layers 220 may be any suitable thickness and may be formed from any suitable material. Skin layers 220 may be formed from or include the same materials as one or more of either the layer capable of developing birefringence 212 or isotropic layer 214. Skin layers 220 may be thin; in some embodiments, skin layers may be thinner than 500 nm, thinner than 300 nm, or thinner than 200 nm. In some embodiments, the skin layers should be thicker than 150 nm.

Polyvinyl alcohol layer 230 may be any suitable thickness. In some embodiments, polyvinyl alcohol layer may be 0.5 μm to 3 μm thick after orientation. In some embodiments, polyvinyl alcohol layer may be 0.8 μm to 2 μm thick after orientation. In some embodiments, polyvinyl alcohol layer may be 1.2 μm to 1.5 μm thick after orientation. The polyvinyl alcohol layer may be coated or extruded over the multilayer polymeric web such that the web and the polyvinyl alcohol layer can be oriented together. In some embodiments, where the layers of the multilayer birefringent reflective polarizer are arranged such that thicker layers are disposed nearer to one side, and thinner layers are disposed near an opposite side, the polyvinyl alcohol layer 230 may be disposed on the side with the thicker layers.

EXAMPLES

Multilayer films are typically formed in roll-to-roll processes wherein the cross-web dimension is commonly labelled transverse direction (TD) and the dimension along the length of the roll is called machine direction (MD). Furthermore, the films are carefully stretched in the forming process in machine direction and transverse direction in carefully controlled temperature zones to affect the birefringent layers in what is commonly referred to as a tentering process. Furthermore, said tentering processes that may provide either linear transverse stretch or parabolic stretch of the packets as they are formed; allowance for controlled shrinkage during the cool down zone may also require a controlled inward linear retraction commonly referred to as "toe-in". Patent references describing common multilayer optical film processes are interspersed in the following examples as are the process deviations which enable the improved pass axis control for wide web/film products.

The examples that follow depict improvements to the pass axis control across large span web handling equipment. These improvements come from non-conventional process condition modifications. The primary metric for improvements to pass axis control is reported for each example (and comparative example) as a range of pass axis angle as measured from 25 locations across the web in the transverse direction.

Pass Axis Control Definition/Test Method

Pass axis orientation for 25 locations equidistant across the useful web width were collected using a rotary analyzer having ability to report angle to 0.01 degree resolution. Of course, an idealized case would have no variation in pass axis orientation between these 25 data points. We define Pass Axis Control as the peak-to-peak spread in range of measured pass axis orientations reported in degrees.

Reflective Polarizer Coated with Polyvinyl Alcohol (PVOH)

These examples are reflective polarizer films coated with polyvinyl alcohol (PVOH) prior to orientation. The process for producing these types of films has been described previously in U.S. Pat. No. 6,096,375 describing means to simultaneously form the multilayer reflective polarizer and the absorbing polarizer.

The process parameters and materials for Example 1 and for the Comparative Examples (CE-1 and CE-2) are shown in Tables 1 and 2.

Xylex EXXX0281 is a polycarbonate/copolyester alloy and is available from Sabic USA (Houston, Tex.). PETg is a copolyester available from Eastman Chemicals (Knoxville, Tenn.). 90/10 CoPEN is a random copolyester that is 90 mol % polyethylene naphthalate and 10 mol % polyethylene terephthalate, produced by 3M Company (Saint Paul, Minn.). PETg-i5 is a polyester based ionomer and is described in U.S. Pre-Grant Patent Publication 2007-0298271 as "polyester O." The transverse direction stretch ratio commonly known as "draw ratio" may be important to pass axis control. Note that Example 1 was fabricated with a draw ratio of 6.86 with good pass axis control whereas CE-1 and CE-2 were fabricated with more conventional draw ratios of 5.05 and 5.98, respectively, but provide relatively poor pass axis control.

As background, the general process for producing the PVOH films is described in U.S. Pat. No. 6,096,375. The cast film can be primed for adhesion before coating by solution coating on an inorganic or polymeric primer layer, corona treatment, or by physical treatment. A suitable solution based primer for this application are water soluble copolyesters commonly used for priming polyethylene terephthalate films such as described in U.S. Pat. No. 4,659,523. The polyvinyl alcohol coating solution should contain between 2 and 20% polymer in water based on weight, with the preferred concentration being between 5 and 15%. The polyvinyl alcohol should have a degree of hydrolysis of between 95 and 100%, preferably between 97 and 99.5%. The dry coating weight should range from 2 to 80 grams per square meter. The polyvinyl alcohol coated cast film is then stretched at elevated temperatures to develop oriented polyvinyl alcohol and the multilayer reflective polarizer. This temperature is preferably above the glass transition temperature of least one of the components of the multilayer reflective polarizer. In general, the temperature should be between 80 and 160° C., preferably between 100 and 160° C. The film should be stretched from 2 to 10 times the original dimension.

Preferably, the film will be stretched from 3 to 6 times the original dimension. The film may be allowed to dimensionally relax in the cross-stretch direction from the natural reduction in cross-stretch direction (equal to the square root of the stretch ratio) to being constrained (i.e. no substantial change in cross-stretch dimensions). The film may be stretched in the machine direction, as with a length orienter, or in width using a tenter. The oriented polyvinyl alcohol coating is then stained with iodine based staining solutions and then borated to fix the coating.

For these particular examples, the PVOH coating solution was composed of 89 weight % water, 11 weight % PVOH, and 0.01 weight % surfactant. The PVOH is Kuraray 2899 from Kuraray America (Houston, Tex.). The surfactant was Dynol 604 available from Air Products (Allentown, Pa.). For these examples the films were stretched from 4 to 7 times the original and resulted in a stretched PVOH layer of 1.2 micrometer thickness.

The iodine staining and borating procedure included the following elements. The stain bath composition was 80 wt % water, 19.7 wt % potassium iodide and 0.3 wt % iodine. The boration bath composition was 80 wt % water, 14 wt % boric acid and 6.0 wt % sodium borate. The staining process step require stain bath of 30° C. and 34 seconds exposure. The boration step required 65° C. bath temperature and 42 second exposure. After boration the samples were rinsed in 23° C. water for 24 seconds and then dried for 5 minutes in 70° C. oven.

The measured values for polarization contrast ratio are commonly defined as the average pass state transmission measured at normal incidence (400-700 nm) divided by the average block state transmission (400-700 nm) measured at normal incidence. Film of Example #1 was iodine stained as described above and the resulting measured contrast ratio was about 4000 which is a useful contrast ratio for a polarizer in a liquid crystal display.

Figure 3:
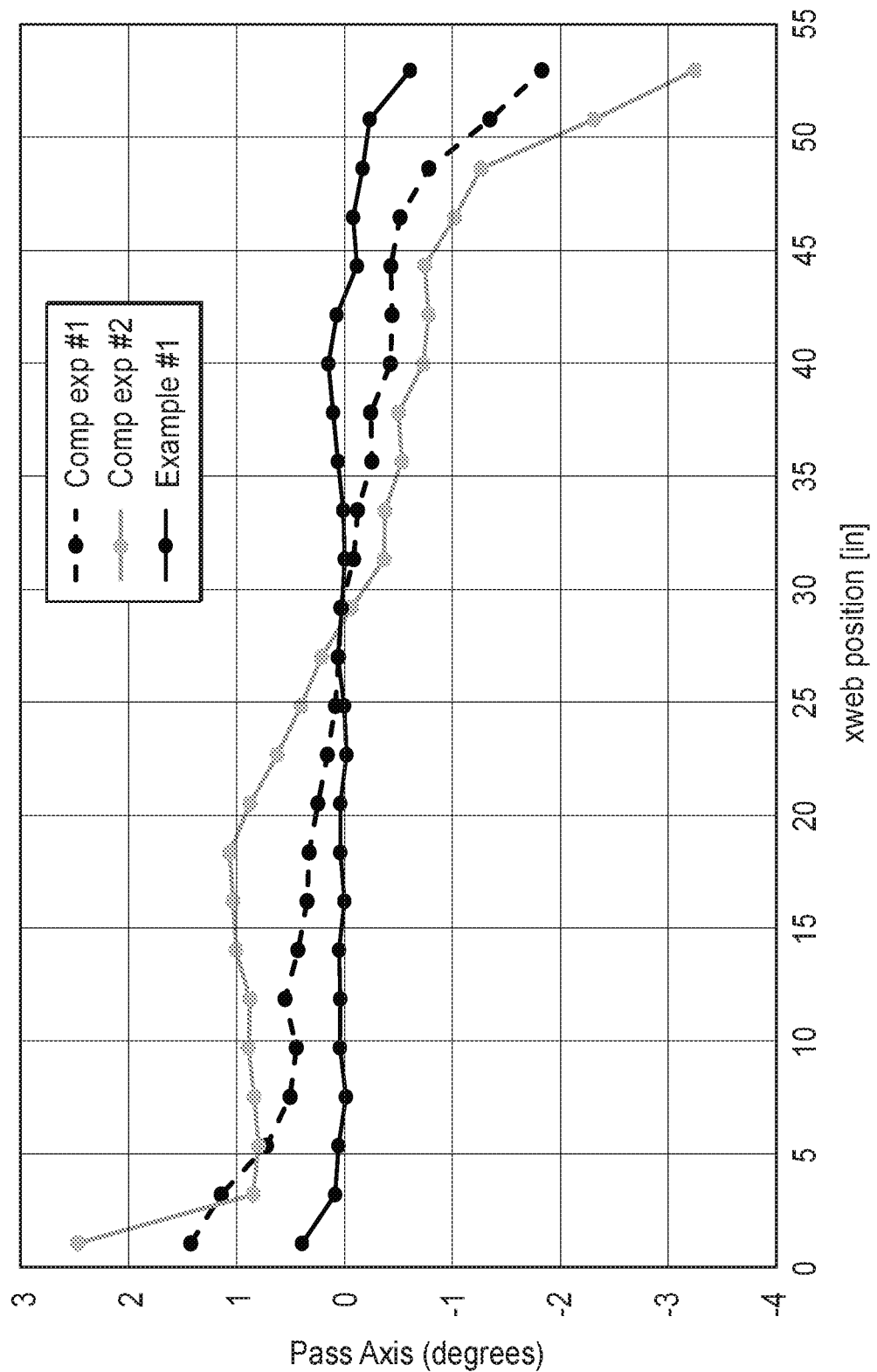
FIG. 3 is a graph showing the crossweb pass axis variation for examples and comparative examples.

The resulting pass axis control for lower draw ratio comparative examples (CE-1 and CE-2) provide poor pass axis control with the range of 3 and 5.7 degrees, respectively. We have discovered that the unconventionally high draw ratios (Example 1), on the other hand, provided a superior pass axis control range of 1.0 degrees to enable wide web utility. The cross-web pass axis profiles are compared in FIG. 3.

wherein the multilayer birefringent reflective polarizer includes an oriented layer of polyvinyl alcohol;

wherein the pass axis of the multilayer birefringent reflective polarizer varies by no more than about 1 degree across a full crossweb width of the roll of film;

wherein the full crossweb width is greater than 27 inches;

wherein the multilayer birefringent reflective polarizer, if stained with iodine dye, exhibits a contrast ratio of at least 2000:1 and a pass state transmission, from 425 nm to 675 nm at normal incidence of at least 60%.

Item 2. The roll of film of item 1, wherein for a greatest stretch direction of the multilayer birefringent reflective polarizer, the birefringent layer and the isotropic layer have an index of refraction difference along that greatest stretch direction of at least 0.2.

Item 3. The roll of film of item 1, wherein the multilayer birefringent reflective polarizer has a top side and a bottom side, wherein the alternating layers include a thickness gradient, wherein the top side is the side adjacent thicker alternating layers, and wherein the oriented layer of polyvinyl alcohol is disposed on the top side.

Item 4. The roll of film of item 1, wherein the multilayer birefringent reflective polarizer, if stained with iodine dye, exhibits a contrast ratio of at least 5000:1.

TABLE 1

Reflective polarizer coated with PVOH process conditions

| | Pass Axis Range (deg) | block state transmission (400-700 nm avg) | pass state transmission (400-700 nm avg) | Pre-heat Zone (F.) | Stretch Zone (F.) | First heat-set zone (F.) | Second heat-set zone (F.) | Cooling Zone (F.) | line speed (feet per minute) |
|---|---|---|---|---|---|---|---|---|---|
| Example #1 | 1 | 0.8 | 88.8 | 295 | 285 | 285 | 260 | 120 | 28 |
| Comparative Example #1 | 3 | 1.6 | 88.4 | 295 | 285 | 285 | 260 | 120 | 30.7 |
| Comparative Example #2 | 5.7 | 3.4 | 87.2 | 295 | 285 | 285 | 260 | 120 | 36.3 |

TABLE 2

Reflective polarizer coated with PVOH process conditions (continued)

| | Birefringent material | Rate of birefringent material (pounds per hour) | Isotropic material | rate of isotropic materials (pounds per hour) | Skin Material | rate of skin materials (pounds per hour) | Transverse Direction Stretch Ratio | Direction Toe-in During Heat-set and cooling |
|---|---|---|---|---|---|---|---|---|
| Example #4 | 90/10 CoPEN | 116 | (90/10 CoPEN)/PETg/PETg-i5 | 63.9/88.2/2 | Xylex EXXX0281/PETg | 19.2/4.8 | 6.86 | 3% |
| Comparative Example #4 | 90/10 CoPEN | 116 | (90/10 CoPEN)/PETg/PETg-i5 | 63.9/88.2/2 | Xylex EXXX0281/PETg | 19.2/4.8 | 5.98 | 3% |
| Comparative Example #5 | 90/10 CoPEN | 116 | (90/10 CoPEN)/PETg/PETg-i5 | 63.9/88.2/2 | Xylex EXXX0281/PETg | 19.2/4.8 | 5.05 | 3% |

The following are exemplary embodiments according to the present disclosure:

Item 1. A roll of film, comprising:

a multilayer birefringent reflective polarizer having a pass axis that varies along a crossweb direction;

wherein the multilayer birefringent reflective polarizer includes alternating layers of a birefringent layer and an isotropic layer;

Item 5. The roll of film of item 1, wherein the multilayer birefringent reflective polarizer, if stained with iodine dye, exhibits a contrast ratio of at least 10000:1.

Item 6. The roll of film of item 1, wherein the multilayer birefringent reflective polarizer, if stained with iodine dye, exhibits a pass state transmission, from 425 nm to 675 nm at normal incidence of at least 70%.

Item 7. The roll of film of item 1, wherein the birefringent layer of the multilayer birefringent reflective polarizer includes polyethylene naphthalate or a copolymer including polyethylene naphthalate.

Item 8. A method of processing a polymeric web, comprising:
providing a polymeric multilayer web including alternating layers of a layer capable of developing birefringence including polyethylene naphthalate or a copolymer including polyethylene naphthalate and polyethylene terephthalate monomers, and an isotropic layer;
coating a layer of polyvinyl alcohol on the polymeric multilayer web;
heating the polymeric multilayer web beyond the glass transition temperature of the layer capable of developing birefringence;
forming a multilayer reflective polarizer by tentering the polymeric multilayer web with a total transverse direction draw ratio of about 6.5 or greater such that the layer capable of developing birefringence develops birefringence;
wherein the multilayer reflective polarizer has a pass axis, and the pass axis varies by no more than 1 degree across a full crossweb width.

Item 9. The method of item 8, wherein the multilayer reflective polarizer, if stained with iodine dye, exhibits a contrast ratio of at least 2000:1 and a pass state transmission, from 425 nm to 675 nm at normal incidence of at least 60%.

Item 10. The method of item 9, wherein the multilayer reflective polarizer, if stained with iodine dye, exhibits a contrast ratio of at least 5000:1.

Item 11. The method of item 8, wherein the multilayer reflective polarizer, if stained with iodine dye, exhibits a contrast ratio of at least 10000:1.

Item 12. The method of item 8, wherein the multilayer reflective polarizer, if stained with iodine dye, exhibits a contrast ratio of at least 13000:1.

What is claimed is:

1. A roll of film, comprising:
a multilayer birefringent reflective polarizer having a pass axis that varies along a crossweb direction;
wherein the multilayer birefringent reflective polarizer includes alternating layers of a birefringent layer and an isotropic layer;
wherein the multilayer birefringent reflective polarizer includes an oriented layer of polyvinyl alcohol;
wherein the pass axis of the multilayer birefringent reflective polarizer varies by no more than about 1 degree across a full crossweb width of the roll of film;
wherein the full crossweb width is greater than 27 inches;
wherein the multilayer birefringent reflective polarizer, if stained with iodine dye, exhibits a contrast ratio of at least 2000:1 and a pass state transmission, from 425 nm to 675 nm at normal incidence, of at least 60%.

2. The roll of film of claim 1, wherein for a greatest stretch direction of the multilayer birefringent reflective polarizer, the birefringent layer and the isotropic layer have an index of refraction difference along that greatest stretch direction of at least 0.2.

3. The roll of film of claim 1, wherein the multilayer birefringent reflective polarizer has a top side and a bottom side, wherein the alternating layers include a thickness gradient, wherein the top side is the side adjacent thicker alternating layers, and wherein the oriented layer of polyvinyl alcohol is disposed on the top side.

4. The roll of film of claim 1, wherein the multilayer birefringent reflective polarizer, if stained with iodine dye, exhibits a contrast ratio of at least 5000:1.

5. The roll of film of claim 1, wherein the multilayer birefringent reflective polarizer, if stained with iodine dye, exhibits a contrast ratio of at least 10000:1.

6. The roll of film of claim 1, wherein the multilayer birefringent reflective polarizer, if stained with iodine dye, exhibits a pass state transmission, from 425 nm to 675 nm at normal incidence of at least 70%.

7. The roll of film of claim 1, wherein the birefringent layer of the multilayer birefringent reflective polarizer includes polyethylene naphthalate or a copolymer including polyethylene naphthalate.

8. A method of processing a polymeric web, comprising:
providing a polymeric multilayer web including alternating layers of a layer capable of developing birefringence including polyethylene naphthalate or a copolymer including polyethylene naphthalate and polyethylene terephthalate monomers, and an isotropic layer;
coating a layer of polyvinyl alcohol on the polymeric multilayer web;
heating the polymeric multilayer web beyond the glass transition temperature of the layer capable of developing birefringence;
forming a multilayer reflective polarizer by tentering the polymeric multilayer web with a total transverse direction draw ratio of about 6.5 or greater such that the layer capable of developing birefringence develops birefringence;
wherein the multilayer reflective polarizer has a pass axis that varies along a crossweb direction, and the pass axis varies by no more than 1 degree across a full crossweb width.

9. The method of claim 8, wherein the multilayer reflective polarizer, if stained with iodine dye, exhibits a contrast ratio of at least 2000:1 and a pass state transmission, from 425 nm to 675 nm at normal incidence of at least 60%.

10. The method of claim 9, wherein the multilayer reflective polarizer, if stained with iodine dye, exhibits a contrast ratio of at least 5000:1.

11. The method of claim 8, wherein the multilayer reflective polarizer, if stained with iodine dye, exhibits a contrast ratio of at least 10000:1.

12. The method of claim 8, wherein the multilayer reflective polarizer, if stained with iodine dye, exhibits a contrast ratio of at least 13000:1.

* * * * *